2 Sheets--Sheet 1.

F. D. STONE & W. MURRAY.
Apparatus for Preserving Eggs.

No. 167,135. Patented Aug. 24, 1875.

2 Sheets--Sheet 2.

F. D. STONE & W. MURRAY.
Apparatus for Preserving Eggs.

No. 167,135. Patented Aug. 24, 1875.

WITNESSES
W. T. Newman
E. F. Nottingham

INVENTORS
Frank D. Stone
Worthington Murray
By Leggett & Leggett
Attorneys.

UNITED STATES PATENT OFFICE.

FRANK D. STONE AND WORTHINGTON MURRAY, OF CLEVELAND, OHIO.

IMPROVEMENT IN APPARATUS FOR PRESERVING EGGS.

Specification forming part of Letters Patent No. 167,135, dated August 24, 1875; application filed July 12, 1875.

*To all whom it may concern:*

Be it known that we, FRANK D. STONE and WORTHINGTON MURRAY, of Cleveland, in the county of Cuyahoga and State of Ohio, have invented certain new and useful Improvements in Machinery for Preserving Eggs, &c.; and we do hereby declare the following to be a full, clear, and exact description of the invention, such as will enable others skilled in the art to which it pertains to make and use it, reference being had to the accompanying drawings, which form part of this specification.

Our invention relates to improved machinery for use in preparing eggs to preserve them; and consists in a receptacle for holding paraffine or other coating compound surrounded by a steam or hot-air jacket and a separate airtight receptacle situated over the same for holding the eggs to be treated, the said receptacle connected with the paraffine by a pipe provided with a stop-cock and an air-pump for exhausting the air from the upper chamber, and from the eggs therein.

At the proper time the melted paraffine is permitted to rush up and fill the vacuum in the upper chamber by opening the stop-cock in the pipe that leads down to the lower chamber. When the eggs have been immersed for a sufficent length of time, the paraffine is permitted to drop back into the lower chamber by opening a vent in the upper chamber, which establishes an equilibrium therein with the external air, substantially as hereinafter set forth and claimed.

Figure 1:
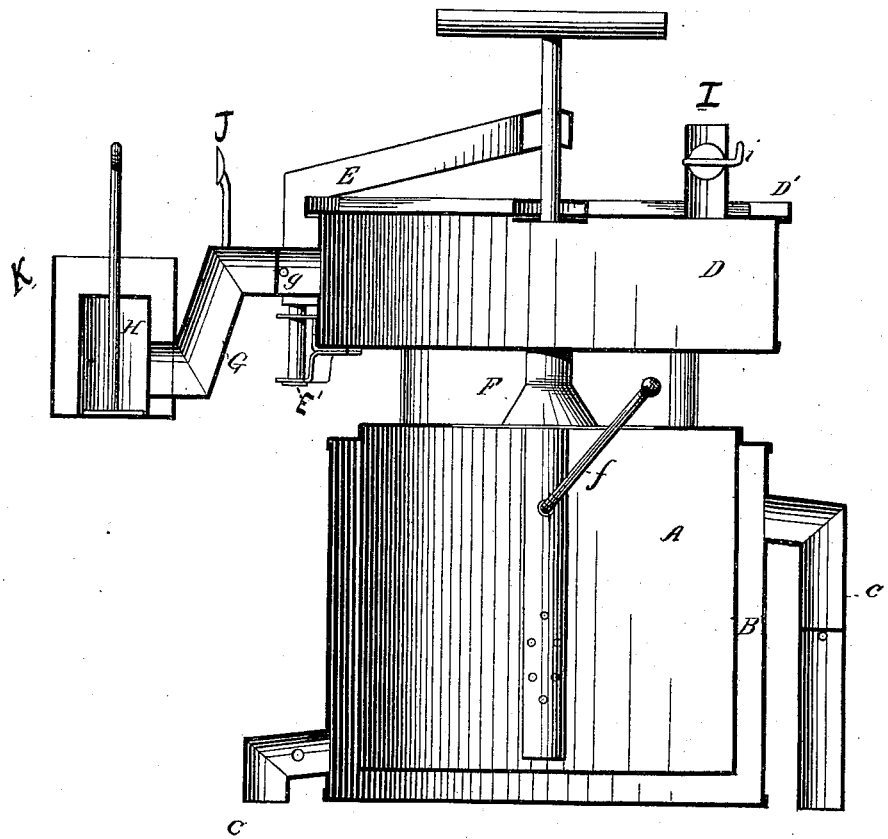
Figure 2:
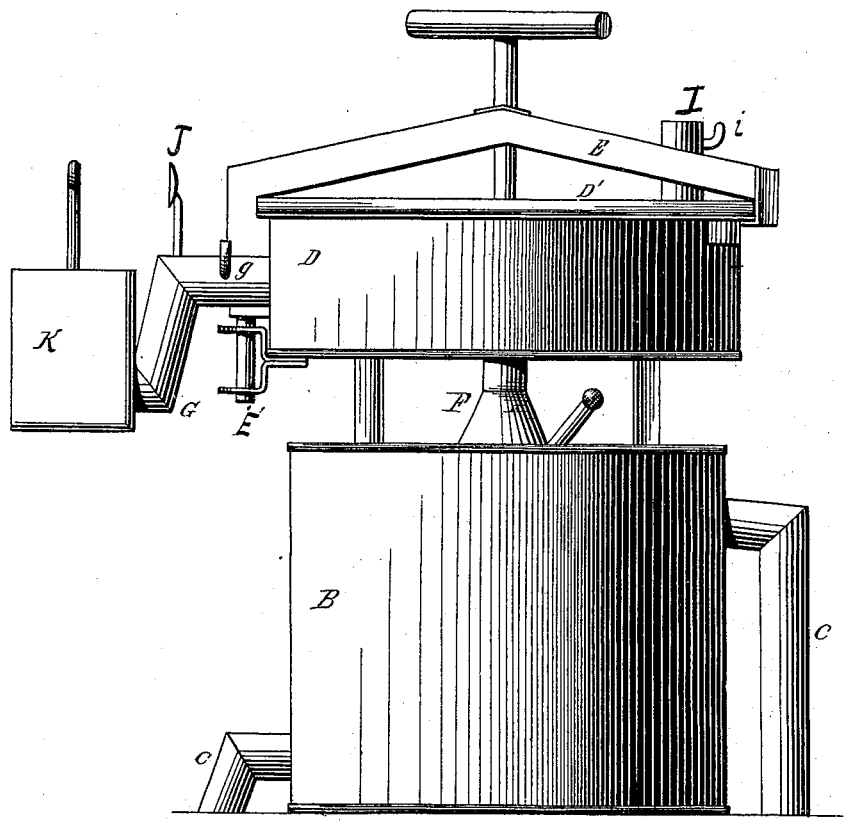

In the drawings, Figure 1 is a vertical sectional view illustrating my invention. Fig. 2 is a side elevation of the apparatus represented in Fig. 1.

A is a receptacle for holding paraffine, wax, or any other substance which is to be melted, and with which the eggs are to be coated. B is an air-tight jacket surrounding the said receptacle A, and communicating with pipes C, whereby the said jacket may be filled with steam or hot air, for the purpose of melting the paraffine or other ingredient in the receptacle A.

For the purpose of coating the eggs without cooking them or damaging them by the heat, the heat of the melted compound should not vary much from 160° Fahrenheit.

D is an upper receptacle, provided with a cover, D'; and an arbor, E, and set-screw E', or their equivalent, may be employed for the purpose of forcing the cap D' firmly down upon the receptacle D, or upon suitable packing placed in the joint, whereby the receptacle D may be made perfectly air-tight. A pipe, F, leads down from the receptacle D to the compound near the bottom of the receptacle A, and the stop-cock $f$, which is located, preferably, below the level of the paraffine, is situated in the said pipe F. Leading from the said receptacle D is another pipe, G, with a valve, $g$, connected with an air-exhaust pump, H, and a third pipe, I, with a valve, $i$, in it, communicates with the external air.

I will now proceed to describe the operation of the device: The arbor E is released by loosening the set-screw E'. The top D' of the receptacle D is then pushed aside, and the eggs, or other article to be treated, are placed in the receptacle D. The cap E is then replaced and firmly sealed by the pressure of the set-screw E', the valves $i$ and $f$ are closed, and the valve $g$ is opened. The air-pump H then exhausts the air from the receptacle D, and from the eggs or other articles in the said receptacle. Valve $g$ is then closed, and the valve $f$ opened. The melted paraffine or coating compound then rushes up to fill the vacuum in the chamber D, and thereby submerges the eggs or other articles in the said receptacle. The valve $i$ is then opened, thus establishing an equilibrium with the external air, and the melted paraffine immediately drops back into the receptacle $a$, leaving the eggs or other articles thoroughly coated with the same, so as to be impervious to the action of the air. In this condition they will be preserved for a long time from decay.

The object in placing the receptacle D over the receptacle A is as follows: When the paraffine in the receptacle A is heated sufficient to melt it, the air above it in the said receptacle is likewise heated and rarefied. We have found it very difficult, in fact almost impossible, to exhaust the heated air from the said receptacle through the exhaust-pump; but we find no difficulty in exhausting the said air through the exhaust-pump when the said air is cool. The receptacle D is, therefore, removed from the receptacle A, so that the air confined by it is kept cool. Should it, however, become warmed by being in proximity to the steam-jacket B, the warm air can readily be driven out, by opening the valve $i$, and operating the pump.

It is evident that, instead of employing this device simply for the treatment of eggs, it may be employed with equal facility for similar treatment of any other animal or vegetable substance, such as fruits, meats, &c. So, also, it is evident that it is equally applicable for the purpose of coating the substance with any other antiseptic fluid or gas, the said antiseptic fluid or gas being retained in the lower receptacle. And it is also apparent that it is only necessary to employ the steam or hot air-jacket where it is necessary to reduce the coating substance by melting, or where it is necessary that the said substance should be applied in a warm state.

For the purpose of testing the degree of rarefaction that is produced in the receptacle D by the exhaust-pump, we may locate a suitable gage, J, at any desired point whereby that rarefaction may be indicated. So, also, we may employ any suitable exhaust-pump; but in the device shown in the drawing we have located the said exhaust-pump in a cell, K, which cell may be filled with water, in order that the pump may work with greater accuracy. So, also, our invention does not limit us to the arbor E and screw E', but any other suitable and convenient fastening may be employed.

What we claim as new is—

1. The apparatus for the treatment of eggs, or other substances to preserve them, consisting of the receptacles A D, the pipe F, air-pump H, and valves $g\ f\ i$, substantially as and for the purpose described.

2. The combination, with the receptacles A D and the air-pump, of the steam-jacket B surrounding the said receptacle A, substantially as and for the purpose described.

In testimony whereof we have signed our name to this specification in the presence of two subscribing witnesses.

FRANK D. STONE.
WORTHINGTON MURRAY.

Witnesses:
FRANCIS TOUMEY,
W. B. EWART.